US012402213B2

(12) United States Patent
Flora et al.

(10) Patent No.: US 12,402,213 B2
(45) Date of Patent: *Aug. 26, 2025

(54) NON-COMBUSTIBLE AEROSOL SYSTEM AND PRE-AEROSOL FORMULATION HOUSING

(71) Applicant: Altria Client Services LLC, Richmond, VA (US)

(72) Inventors: Jason Flora, Richmond, VA (US); Eric Hawes, Glen Allen, VA (US); San Li, Midlothian, VA (US)

(73) Assignee: ALTRIA CLIENT SERVICES LLC, Richmond, VA (US)

(*) Notice: Subject to any disclaimer, the term of this patent is extended or adjusted under 35 U.S.C. 154(b) by 349 days.

This patent is subject to a terminal disclaimer.

(21) Appl. No.: 17/975,923

(22) Filed: Oct. 28, 2022

(65) Prior Publication Data

US 2023/0055944 A1 Feb. 23, 2023

Related U.S. Application Data

(63) Continuation of application No. 16/251,452, filed on Jan. 18, 2019, now Pat. No. 11,523,470.

(51) Int. Cl.
*A24F 47/00* (2020.01)
*A24B 15/12* (2006.01)
(Continued)

(52) U.S. Cl.
CPC ............... *H05B 3/44* (2013.01); *A24B 15/12* (2013.01); *A24B 15/16* (2013.01); *A24F 40/20* (2020.01);
(Continued)

(58) Field of Classification Search
CPC ........... A24F 40/20; A24F 40/42; A24F 40/46
See application file for complete search history.

(56) References Cited

U.S. PATENT DOCUMENTS

| | | | |
|---|---|---|---|
| 5,530,225 | A | 6/1996 | Hajaligol |
| 8,091,558 | B2 | 1/2012 | Martzel |

(Continued)

FOREIGN PATENT DOCUMENTS

| | | | |
|---|---|---|---|
| CA | 3014568 | A1 | 10/2017 |
| CN | 105167182 | A | 12/2015 |

(Continued)

OTHER PUBLICATIONS

Japanese Office Action for Application No. 2021-541281, dated Oct. 31, 2023, with English translation included.

(Continued)

*Primary Examiner* — Eric Yaary
(74) *Attorney, Agent, or Firm* — Harness, Dickey & Pierce, P.L.C.

(57) ABSTRACT

A non-combustible aerosol system includes a heater configured to supply heat to a heating chamber and a housing configured to be inserted into the heating chamber. The housing defines an internal volume for containing a solid substrate. The housing includes a plurality of internal structures extending from a first end of the housing to a second end of the housing, the plurality of internal structures extending through the internal volume, the plurality of internal structures being configured to heat the solid substrate to generate an aerosol by conducting the heat supplied by the heater to the internal volume.

23 Claims, 12 Drawing Sheets

(51) Int. Cl.

| | |
|---|---|
| ***A24B 15/16*** | (2020.01) |
| ***A24F 40/20*** | (2020.01) |
| ***A24F 40/42*** | (2020.01) |
| ***A24F 40/46*** | (2020.01) |
| ***A24F 40/51*** | (2020.01) |
| ***H05B 3/40*** | (2006.01) |
| ***H05B 3/44*** | (2006.01) |

(52) U.S. Cl.
CPC .............. *A24F 40/42* (2020.01); *A24F 40/46* (2020.01); *A24F 40/51* (2020.01); *H05B 3/40* (2013.01)

(56) References Cited

U.S. PATENT DOCUMENTS

| | | | |
|---|---|---|---|
| 8,469,035 | B2 | 6/2013 | Banerjee et al. |
| 8,890,040 | B2 | 11/2014 | Greim et al. |
| 9,072,321 | B2 | 7/2015 | Liu |
| 9,717,274 | B2 | 8/2017 | Daehne et al. |
| 2013/0192619 | A1 | 8/2013 | Tucker et al. |
| 2013/0255702 | A1 | 10/2013 | Griffith, Jr. et al. |
| 2014/0299137 | A1 | 10/2014 | Kieckbusch et al. |
| 2015/0040929 | A1 | 2/2015 | Hon |
| 2015/0216237 | A1 | 8/2015 | Wensley et al. |
| 2015/0305410 | A1 | 10/2015 | Liu |
| 2015/0351456 | A1 | 12/2015 | Johnson et al. |
| 2016/0073695 | A1 | 3/2016 | Sears et al. |
| 2017/0245546 | A1 | 8/2017 | Huang |
| 2017/0280772 | A1 | 10/2017 | Batista et al. |
| 2018/0098576 | A1 | 4/2018 | Hedarchet |
| 2018/0177240 | A1 | 6/2018 | Duque et al. |
| 2018/0352858 | A1 | 12/2018 | Rojo-Calderon |

FOREIGN PATENT DOCUMENTS

| | | | |
|---|---|---|---|
| CN | 204907942 | U | 12/2015 |
| CN | 106255429 | A | 12/2016 |
| CN | 106998817 | A | 8/2017 |
| CN | 107427086 | A | 12/2017 |
| CN | 108025149 | A | 5/2018 |
| CN | 108135266 | A | 6/2018 |
| CN | 108348012 | A | 7/2018 |
| CN | 109068752 | A | 12/2018 |
| EP | 2725932 | B1 | 5/2014 |
| JP | 2017-526381 | A | 9/2017 |
| JP | 2018-504127 | A | 2/2018 |
| JP | 2018-510630 | A | 4/2018 |
| JP | 2018-512141 | A | 5/2018 |
| WO | WO-96/032854 | | 10/1996 |
| WO | WO-2013102609 | A2 | 7/2013 |
| WO | WO-2014/061477 | A1 | 4/2014 |
| WO | WO-2015176898 | A1 | 11/2015 |
| WO | WO-2016096927 | A1 | 6/2016 |
| WO | WO-2016120344 | A2 | 8/2016 |
| WO | WO-2016184978 | A1 | 11/2016 |
| WO | WO-2017/042081 | A1 | 3/2017 |
| WO | WO-2017093356 | A1 | 6/2017 |
| WO | WO-2017/207443 | A1 | 12/2017 |
| WO | 2018/130391 | A1 | 7/2018 |

OTHER PUBLICATIONS

Chinese Office Action for Application No. 2020800160610, dated Jan. 18, 2024, with English translation.

Chinese Office Action for Application No. 2020800160610, dated Aug. 1, 2024, with English translation.

Eurpoean Office Action for Application No. 24185145.0, dated Nov. 6, 2024.

http://ezshopex.com/iqos-tobacco-heating-system.html.

Wan William, "Is new smokeless cigarette healthier ?: Maker fights back after researchers' questions," Dayton Daily News, Aug. 27, 2017.

International Search Report and Written Opinion dated Apr. 21, 2020.

Japanese Office Action for Application No. 2024-060524, dated May 27, 2025, with English translation included.

NON-COMBUSTIBLE AEROSOL SYSTEM AND PRE-AEROSOL FORMULATION HOUSING

PRIORITY

This non-provisional patent application is a continuation of U.S. application Ser. No. 16/251,452, filed on Jan. 18, 2019, the entire contents of each of which are incorporated herein by reference.

BACKGROUND

Field

At least some example embodiments relate generally to a non-combustible aerosol device.

Description of Related Art

A non-combustible aerosol device may have a heater that heats a solid substrate, such as tobacco, without causing combustion of the solid substrate.

The non-combustible aerosol device includes a power supply, such as a rechargeable battery, arranged in the device. The battery is electrically connected to the heater, such that the heater heats the solid substrate.

SUMMARY

Some example embodiments provide a non-combustible aerosol system including a heater configured to supply heat to a heating chamber and a housing configured to be inserted into the heating chamber, the housing defining an internal volume for containing a solid substrate.

In some example embodiments, the solid substrate is a tobacco material which may include material from any member of the genus *Nicotiana*. In some example embodiments, the tobacco material includes a blend of two or more different tobacco varieties. Examples of suitable types of tobacco materials that may be used include, but are not limited to, flue-cured tobacco, Burley tobacco, Dark tobacco, Maryland tobacco, Oriental tobacco, rare tobacco, specialty tobacco, blends thereof and the like. The tobacco material may be provided in any suitable form, including, but not limited to, tobacco lamina, processed tobacco materials, such as volume expanded or puffed tobacco, processed tobacco stems, such as cut-rolled or cut-puffed stems, reconstituted tobacco materials, blends thereof, and the like. In some example embodiments, the tobacco material is in the form of a substantially dry tobacco mass.

In some example embodiments, the tobacco material is mixed and/or combined with at least one of propylene glycol, glycerin or sub-combinations thereof or combinations thereof.

The housing includes a plurality of internal structures extending from a first end of the housing to a second end of the housing, the plurality of internal structures extending through the internal volume, the plurality of internal structures being configured to heat the solid substrate to generate an aerosol by conducting the heat supplied by the heater to the internal volume.

In some example embodiments, the housing further includes a first plate defining the first end of the housing and a second plate defining the second end of the housing, the first and second ends of the housing being opposite sides of the housing.

In some example embodiments, the first plate and the second plate are a first material and the plurality of internal structures are a second material, the first material and the second material are different.

In some example embodiments, the first plate, the second plate and the plurality of internal structures are a same material.

In some example embodiments, the housing further includes an outer wall defining the internal volume, the outer wall being one of solid and a mesh.

In some example embodiments, the outer wall is solid and the non-combustible aerosol system includes a piercing element configured to pierce the housing and generate an outlet for the aerosol.

In some example embodiments, the outer wall is a mesh and provides an outlet for the aerosol.

In some example embodiments, the housing further includes a first plate defining the first end of the housing and a second plate defining the second end of the housing, the first and second ends of the housing being opposite sides of the housing, the outer wall extending from the first plate to the second plate.

In some example embodiments, the housing is cylindrical.

In some example embodiments, the non-combustible aerosol system is not configured to supply an electrical current to the housing.

In some example embodiments, the solid substrate includes at least one of tobacco leaf, reconstituted tobacco, compressed tobacco rod, powdered tobacco, a sub-combination thereof or a combination thereof.

In some example embodiments, the non-combustible further includes a first outlet on a first side of the aerosol forming device and a second outlet on a second side of the aerosol forming device.

In some example embodiments, the second outlet is a one-way valve.

In some example embodiments, the plurality of internal structures are different materials.

In some example embodiments, the plurality of internal structures extend in a direction that traverses a longitudinal axis of the aerosol forming device.

In some example embodiments, the non-combustible further includes a first plate defining the first end of the housing and a second plate defining the second end of the housing, the first and second ends of the housing being opposite sides of the housing, the plurality of internal structures extending from the first plate to the second plate.

At least one example embodiment includes a method of operating a non-combustible aerosol system. The method includes inserting a housing into a non-combustible aerosol device, the housing defining an internal volume for containing a solid substrate, the housing including a plurality of internal structures extending from a first end of the housing to a second end of the housing, the plurality of internal structures extending through the internal volume, the plurality of internal structures being configured to heat the solid substrate to generate an aerosol by conducting the heat supplied by the heater to the internal volume, and activating the non-combustible aerosol device.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1:
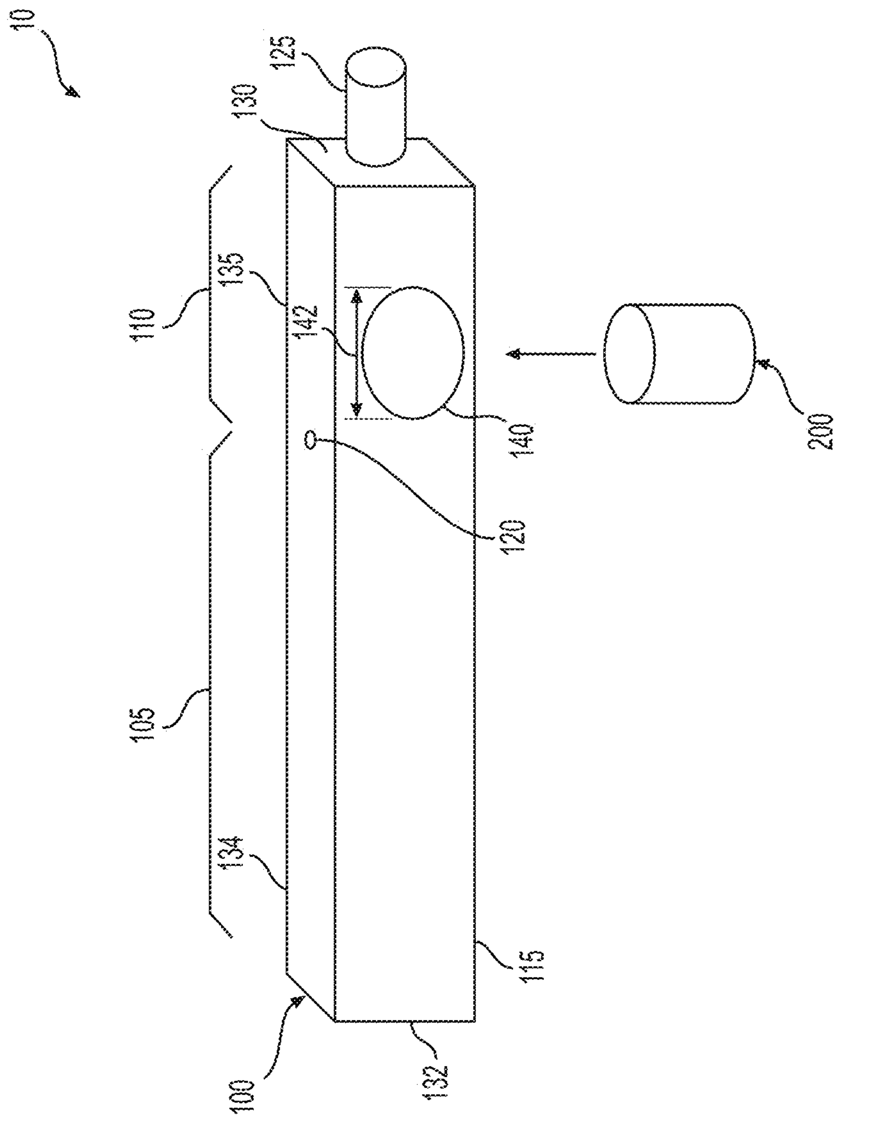
FIG. 1 is a side view of a non-combustible aerosol system according to some example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives thereof. Like numbers refer to like elements throughout the description of the figures.

It should be understood that when an element or layer is referred to as being "on," "connected to," "coupled to," "attached to," "adjacent to," or "covering" another element or layer, it may be directly on, connected to, coupled to, attached to, adjacent to or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations or sub-combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

When the words "about" and "substantially" are used in this specification in connection with a numerical value, it is intended that the associated numerical value include a tolerance of ±10% around the stated numerical value, unless otherwise explicitly defined.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Hardware may be implemented using processing or control circuitry such as, but not limited to, one or more processors, one or more Central Processing Units (CPUs), one or more microcontrollers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Aerosol, vapor and dispersion are terms used interchangeably and are meant to cover any matter generated or output by the devices claimed and equivalents thereof. The pre-aerosol formulation may also be a pre-vapor formulation or a pre-dispersion formulation.

FIG. 1 is a side view of non-combustible aerosol system according to at least one example embodiment. As shown in FIG. 1, a non-combustible aerosol system 10 includes a non-combustible aerosol device 100 and a pre-aerosol formulation housing 200. The pre-aerosol formulation housing 200 may include pre-aerosol formulation that is a solid substrate (in example embodiments with tobacco, referred to as a tobacco housing).

The non-combustible aerosol device 100 may include a power section 105 and a heating section 110. In FIG. 1, the non-combustible aerosol device 100 includes a housing 115. In at least one example embodiment, the housing 115 may have a generally square cross-section. In other example embodiments, the housing 115 may have a generally triangular or circular cross-section.

As shown, a power section 105 and a heating section 110 are integral sections of the housing 115. However, it should be understood that example embodiments are not limited thereto and the power section 105 and heating section 110 may have separate detachable housings. For example, the heating section 110 may be a replaceable cartridge and the power section 105 may be a reusable battery section. The power section 105 and the heating section 110 may be coupled together by any type of connector, such as a snug-fit, detent, clamp, bayonet, and/or clasp.

The housing 115 extends in a longitudinal direction between a first end 130 and a second end 132.

At least one air inlet 120 extends through a portion of the housing 115. In at least one example embodiment, the at least one air inlet 120 may be formed in the housing 115 to control a resistance-to-draw (RTD) during use. In at least one example embodiment, the air inlet 120 may be machined into the housing 115 with precision tooling such that their diameters are closely controlled and replicated from one non-combustible aerosol device 100 to the next during manufacture.

In at least one example embodiment, the air inlet 120 may be sized and configured such that the non-combustible aerosol device 100 has a desired resistance-to-draw (RTD) range of 20 to 150 mm of water.

The non-combustible aerosol device 100 includes a mouthpiece 125 at the first end 130 of the non-combustible aerosol device 100. As shown in FIG. 1, the heating section 110 is at a proximal end 135 of the non-combustible aerosol device 100 (relative to the mouthpiece 125) and the power section 105 is at a distal end 134 of the non-combustible aerosol device 100 (relative to the mouthpiece 125).

At least one side of the housing 115 in the heating section 110 defines an opening 140 of a channel space within the housing 115 in the non-combustible aerosol device 100. In some example embodiments, the opening 140 may have a same shape as the pre-aerosol formulation housing 200. While the opening 140 is illustrated as being elliptical, example embodiments are not limited thereto. For example, the opening 140 may be circular, rectangular, triangular or another polygon.

The opening 140 may be configured to receive, into a channel space of the non-combustible aerosol device 100, the pre-aerosol formulation housing 200.

Figure 2:
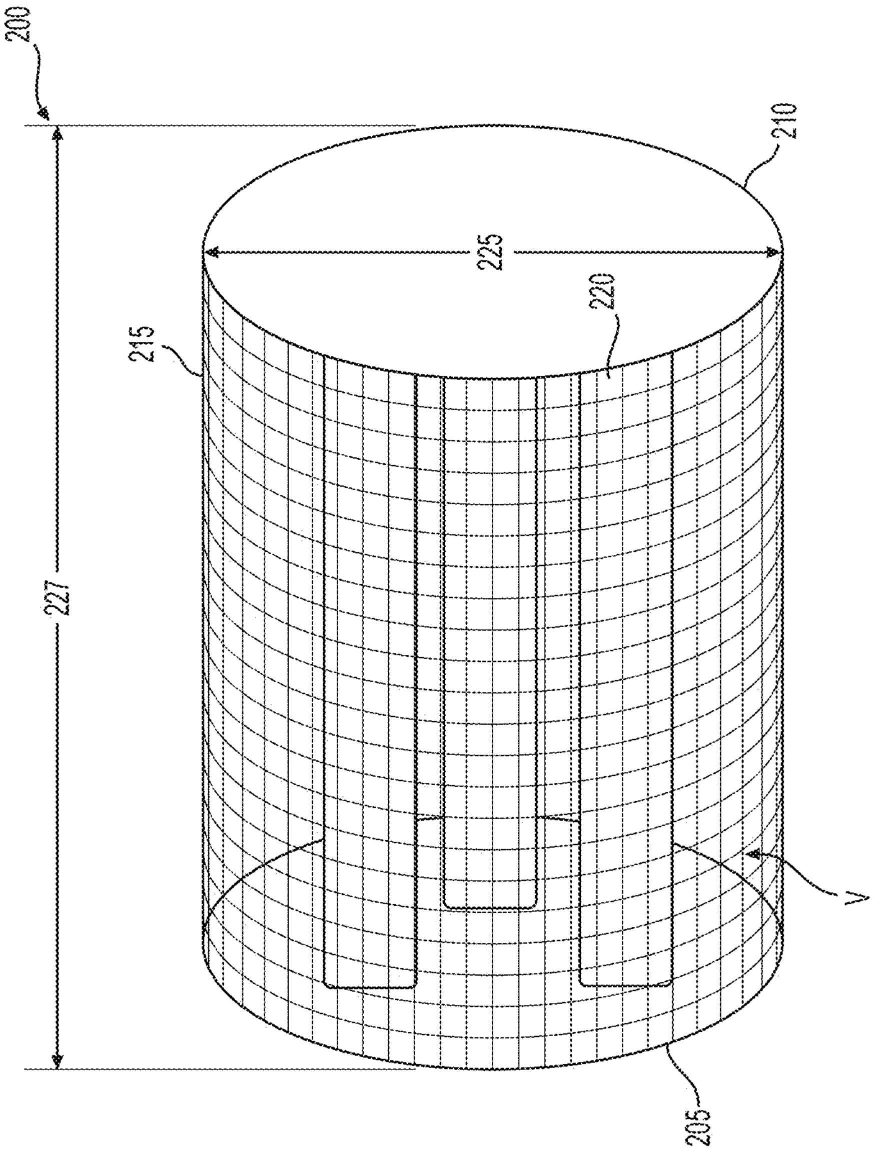
FIG. 2 illustrates a pre-aerosol formulation housing according to some example embodiments.

FIG. 2 illustrates an example embodiment of the pre-aerosol formulation housing 200. A cross-sectional shape of the pre-aerosol formulation housing 200 may have a same shape as the opening 140 and may have an outer diameter that corresponds to a diameter 142 of the opening 140. As shown in FIG. 2, the pre-aerosol formulation housing 200 is an encased capsule and includes a first plate 205, a second plate 210 and a lateral outer wall 215. The outer wall 215, the first plate 205 and the second plate 210 form the encased capsule. The pre-aerosol formulation housing 200 may be cylindrical with the first plate 205 and the second plate 210 being circular ends, respectively, of the pre-aerosol formulation housing 200. The wall 215 extends from the first plate 205 to the second plate 210 and defines an internal volume V that has a diameter corresponding to diameters (e.g., the same) of the first plate 205 and the second plate 210. The outer wall 215 closes off the internal volume V between the first plate 205 and the second plate 210 to prevent the pre-aerosol formulation from escaping the pre-aerosol formulation housing 200.

A pliable material such as a polymer can be used on the plates 205 and 210 of the pre-aerosol formulation housing 200 and on the opening 140 which creates a seal when the pre-aerosol formulation housing 200 is inserted into the housing 115.

A plurality of internal structures 220 extend from the first plate 205 to the second plate 210. In some example embodiments, the internal structures 220 are elongated and have a longitudinal direction traversing an air flow direction when inserted in the housing 115. In the example embodiments shown in FIG. 2, the internal structures 220 have a square cross section. However, the internal structures 220 may be any cross-sectional shape such as rectangular, oval and circular. Moreover, each of the internal structures 220 may have a different cross sectional shape.

The internal structures 220 are made of a material that conducts heat to heat a pre-aerosol formulation within the pre-aerosol formulation housing 200 without combustion occurring. For example, a heater (e.g., shown in FIG. 3) and the pre-aerosol formulation housing 200 are configured to heat the pre-aerosol formulation to a temperature ranging from 100 to 350 degrees Celsius to produce an aerosol. The internal structures 220 create more surface area contact with the pre-aerosol formulation and improve a heating efficiency of the pre-aerosol formulation.

The pre-aerosol formulation housing 200 may be made of any material that conducts heat. In some example embodiments, the pre-aerosol formulation housing 200 may be made of metal and, thus, may be referred to as a metallic housing. The internal structures 220 may be made of the same material as the first plate 205, the second plate 210 and the outer wall 215 or may be made of a different material. Moreover, the internal structures 220 may all be made of the same material or at least one of the internal structures 220 may be made of a different material than the remaining internal structures.

The internal structures 220 are attached to the first plate 205 and the second plate 210 by any means that permits the internal structure 220 to sufficiently conduct heat from the plates 205, 210 such as soldering, welding or a male/female friction fit connection.

For example, the internal structures 220 may be made of pure metals, alloys, and/or polymers.

A diameter 225 of the plates 205, 210 may be 1-20 millimeters and a width 227 of the pre-aerosol formulation housing 200 may be 1-20 millimeters. In some example embodiments, the width 227 traverses the longitudinal axis of the non-combustible aerosol device 100. The width 227 may be the same or smaller than a length of the chamber 144.

As shown in FIG. 2, the outer wall 215 is a mesh in some example embodiments, but is not limited thereto. When the outer wall 215 is a mesh, the generated aerosol may escape the pre-aerosol formulation housing 200 through holes in the mesh and flow to the mouthpiece 125.

The pre-aerosol formulation housing 200 may house a pre-aerosol formulation with the first plate 205, the second plate 210 and the outer wall 215 being configured to conduct heat from the heater 148 to heat the pre-aerosol formulation.

Figure 3:
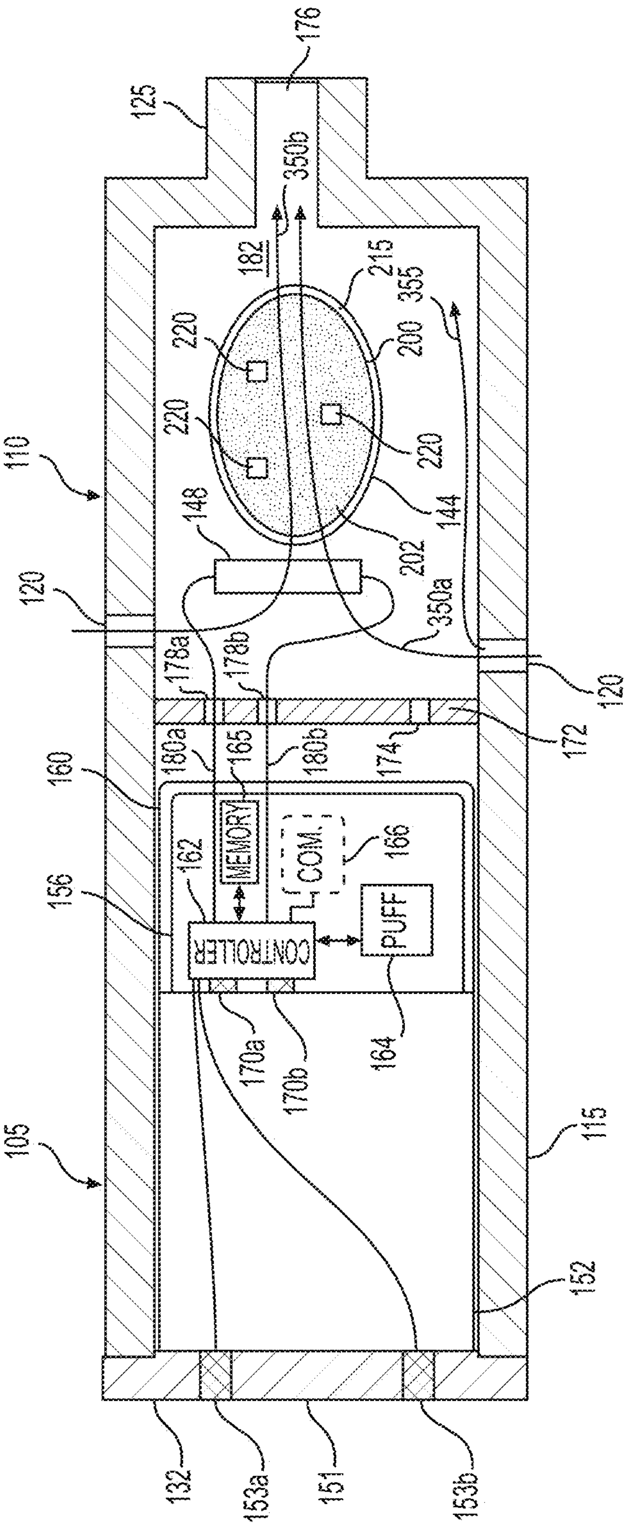
FIG. 3 illustrates a cross-sectional view of the non-combustible aerosol system of FIG. 2.

FIG. 3 illustrates a cross-sectional view of the non-combustible aerosol system 10 according to some example embodiments. As shown in FIG. 3, the opening 140 may be configured to receive, into a channel space of the non-combustible aerosol device 100, the pre-aerosol formulation housing 200. The pre-aerosol formulation housing 200 may have a same shape as the opening 140 and may have an outer diameter that corresponds to the diameter 142 of the opening 140. In some example embodiments, the pre-aerosol formulation housing 200 has an outer diameter smaller than the diameter 142 such that the pre-aerosol formulation housing 200 may be inserted into the opening 140. While the pre-aerosol formulation housing 200 is illustrated as having an elliptical cross-section (cut normal to a longitudinal axis of the pre-aerosol formulation housing 200), example embodiments are not limited thereto. For example, the pre-aerosol formulation housing 200 may have a cross section that is circular, rectangular, triangular or another polygon.

The opening 140 provides access to a chamber 144. In some example embodiments, the chamber 144 has a same shape as the opening 140. A diameter of the chamber 144 may be the same as the diameter 142. A seal is formed between the housing 115 and the pre-aerosol formulation housing 200 due to the specific size of the pre-aerosol formulation housing 200 and the chamber 144 providing a secure fit. A seal can also be formed by spring loaded plates (not shown) at the front and back of the chamber 144 that provide pressure on the front and back of the pre-aerosol formulation housing 200 once the pre-aerosol formulation housing 200 is inserted.

In some example embodiments, ends of the pre-aerosol formulation housing 200 may be exposed to ambient air once inserted into the non-combustible aerosol device 100. Alternatively, the non-combustible aerosol device 100 may include a cover that covers the opening 140 once the pre-aerosol formulation housing 200 is inserted into the non-combustible aerosol device 100. The cover may be hinged, slidable, spring loaded or another type of cover.

In some example embodiments, the housing 115 may include an opening on an opposite side of the side with the opening 140 that opposes the opening 140. In other example embodiments, the opposite side of the side with the opening 140 does not have an opening.

The pre-aerosol formulation housing 200 may be inserted into a channel space defined by the chamber 144, via the opening 140, so that the pre-aerosol formulation housing 200 is exposed to heat generated by a heater 148. In some example embodiments, the pre-aerosol formulation housing 200 does not contact a heat source such as the heater 148 and/or an electrical source. Rather, the pre-aerosol formulation housing 200 is made of a material that conducts heat generated from the heater 148 to heat a pre-aerosol formulation 202 (e.g., tobacco) in the pre-aerosol formulation housing 200 and, thus, no electrical heating of the pre-aerosol formulation housing 200 occurs.

The pre-aerosol formulation housing 200 may conduct the heat generated by the heater 148 to the pre-aerosol formulation 202 to an extent that flavoring, nicotine and/or ingredients in the pre-aerosol formulation 202 is at least partially extracted (e.g., aerosolized) to create a downstream aerosol **350*b* (and a bypass airflow 355 that may contain aerosol) that is extracted from the pre-aerosol formulation 202. The pre-aerosol formulation housing 200 heats the pre-aerosol formulation 202 to an extent that the pre-aerosol formulation 202 and the flavoring, nicotine and/or pre-aerosol formulation remain below a combustion temperature. That is to say, in some example embodiments, the pre-aerosol formulation housing 200 does not combust any material in the pre-aerosol formulation 202**, including the flavoring, nicotine and/or pre-aerosol formulation.

As described, the pre-aerosol formulation housing 200 includes at least an outer wall 215 and internal structures 220 that conduct heat to heat the pre-aerosol formulation 202. While the internal structures 220 are illustrated as traversing the longitudinal axis of the non-combustible aerosol device 100, example embodiments are not limited thereto and the internal structures 220 may be parallel to the longitudinal axis of the non-combustible aerosol device 100.

In some example embodiments, the heater 148 contacts the pre-aerosol formulation housing 200. In other example embodiments, the heater 148 is at a distance from the heater 148 to generate a desired temperature.

The power section 105 includes a power supply 152 and a circuit board 156 arranged in the non-combustible aerosol device 100. The power supply 152 and the circuit board 156 may be mounted on a common support 160. The common support 160 is structured to fit within the housing 115 to eliminate/reduce movement of the power supply 152 and the circuit board 156 when the non-combustible aerosol device 100 is in use.

The power supply 152 may be a Lithium-ion battery or one of its variants, for example a Lithium-ion polymer battery. Alternatively, the power supply 152 may be a nickel-metal hydride battery, a nickel cadmium battery, a lithium-manganese battery, a lithium-cobalt battery, solar cell or a fuel cell. The non-combustible aerosol device 100 may be used until the energy in the power supply 152 is depleted or in the case of lithium polymer battery, a minimum voltage cut-off level is achieved.

The circuit board 156 may include at least control circuitry 162, an air flow sensor 164 and a memory 165. The circuit board 156 may include other circuitry such as communications circuitry 166 (e.g., Bluetooth™) to communicate wirelessly with an external device such as a mobile phone. Thus, the non-combustible aerosol device 100 is not limited to the circuitry shown in FIG. 3. The memory 165 (e.g., a tangible storage medium) may be read-only memory (ROM), random access memory (RAM), or flash memory (e.g., USB flash drives, memory cards, memory sticks, etc.), for example. Example embodiments are not limited by these aspects of any given implementation.

In at least one example embodiment, the control circuitry 162 may include at least one processor. In this example, the processor may be any known, or to be developed, processor configured to execute computer-readable instructions stored on the memory 165. Execution of the computer-readable instructions stored on the memory 165 transforms the at least one processor into a special purpose processor for carrying out the functionality described herein. The memory 165 may be further configured to store various types of information regarding the non-combustible aerosol system 10, such as that described above.

Although discussed in some cases with regard to a processor and a memory, according to at least some example embodiments, the control circuitry 162 (or control circuitry or processing circuitry) may be (or include) hardware, firmware, hardware executing software, or any combination thereof. For example, the control circuitry 162 may include one or more Central Processing Units (CPUs), digital signal processors (DSPs), application-specific-integrated-circuits (ASICs), field programmable gate arrays (FPGAs), or other circuitry configured as special purpose machines to perform the functions of the control circuitry 162.

The control circuitry 162 is connected to the power supply 152 by a cathode connector 170*a* and an anode connector 170*b*. The control circuitry 162 is configured to supply power to electrical components (e.g., the heater 148, the air flow sensor 164 and the memory 165) of the non-combustible aerosol device 100 using power supplied from the power supply 152.

The power section 105 may be separated from the heating section 110 by a divider 172. The divider 172 may be a gasket (or seal) that provides a substantially tight seal with an interior surface of the housing 115. The divider 172 may include a channel 174 disposed between the power section 105 and the heating section 110 to allow a negative pressure to be applied in the power section 105 when air is pulled through the air inlet 120 (e.g., when air is pulled through an outlet 176 of the mouthpiece 125).

The divider 172 may also include holes 178*a* and 178*b*. The holes 178*a* and 178*b* are sized to fit wires 180*a* and 180*b*. In other example embodiments, electrical contacts may be used instead of the wires 180*a* and 180*b*. The holes 178*a* and 178*b* may be sized so no air flows between the power section 105 and the heating section 110 through the holes 178*a* and 178*b*. In other example embodiments, seals may be in the holes 178*a* and 178*b* to prevent air flowing between the power section 105 and the heating section 110.

The heater 148 may extend transversely across an inner passage 182 between opposing walls of the housing 115. In some example embodiments, the heater 148 may extend parallel to a longitudinal axis of the inner passage 182.

The power section 105 may further include an end cap 151 at the second end 132. The end cap 151 may seal off the second end 132. The end cap 151 may attach to the housing 115 using known connection systems such as threaded connectors and/or friction fit connection systems. The end cap 151 may include electrical contacts 153*a* and 153*b* for charging the power supply 152.

In another example embodiment, the end cap 151 may be an integral portion of the housing 115.

In at least one example embodiment, the power supply 152 is rechargeable. The power section 105 may include circuitry configured to allow the battery to be chargeable by an external charging device. To recharge the non-combustible aerosol device 100, an USB charger or other suitable charger assembly may be used by connecting an external charger to the electrical contacts 153*a* and 153*b*. The control circuitry 162 is connected to the electrical contacts 153*a* and 153*b* and controls the resupply of power to the power supply 152.

The heater 148 can be in the form of a wire coil, a planar body, a ceramic body, a single wire, a cage of resistive wire or any other suitable form. The heater 148 may be any heater that is configured to heat a pre-aerosol formulation to a sufficient temperature to generate an aerosol.

In at least one example embodiment, the heater may be formed of any suitable electrically resistive materials. For example, the heater 148 may include at least one material selected from the group consisting of stainless steel, copper, copper alloys, nickel-chromium alloys, super alloys, or sub-combinations thereof or combinations thereof. In an example embodiment, the heater 148 may be formed of nickel-chromium alloys or iron-chromium alloys. In another example embodiment, the heater 148 may be a ceramic heater having an electrically resistive layer on an outside surface thereof.

In at least one example embodiment, the heater 148 may heat the pre-aerosol formulation housing 200 by thermal conduction. Alternatively, heat from the heater 148 may be conducted to the pre-aerosol formulation housing 200 by means of a heat conductive element or the heater 148 may transfer heat to the incoming ambient air that is drawn through the non-combustible aerosol device 100 during use, which in turn heats the pre-aerosol formulation housing 200 by convection.

The pre-aerosol formulation housing 200 resides in or near an airflow path 350*a* that is defined by the non-combustible aerosol device 100. This airflow path 350*a* may be formed, for instance, by the air inlets 120 and the outlet 176. The airflow path 350*a* may pass across the pre-aerosol formulation housing 200 or directly through the pre-aerosol formulation housing 200. It should be understood that, in the event the non-combustible aerosol device 100 includes a bypass airflow 355, this bypass airflow 355 may include an entrained aerosol just as the downstream aerosol 350*b* (that passed through the matrix pre-aerosol formulation housing 200) also includes an aerosol, if the bypass airflow 355 passes across an exposed surface of the pre-aerosol formulation housing 200.

In some example embodiments, the pre-aerosol formulation includes a botanical material. For example, a botanical material may include a tobacco material.

In some example embodiments, the tobacco material may include material from any member of the genus *Nicotiana*. In some example embodiments, the tobacco material includes a blend of two or more different tobacco varieties. Examples of suitable types of tobacco materials that may be used include, but are not limited to, flue-cured tobacco, Burley tobacco, Dark tobacco, Maryland tobacco, Oriental tobacco, rare tobacco, specialty tobacco, blends thereof and the like. The tobacco material may be provided in any suitable form, including, but not limited to, tobacco lamina, processed tobacco materials, such as volume expanded or puffed tobacco, processed tobacco stems, such as cut-rolled or cut-puffed stems, reconstituted tobacco materials, blends thereof, and the like. In some example embodiments, the tobacco material is in the form of a substantially dry tobacco mass.

In some example embodiments, the tobacco material is mixed and/or combined with at least one of propylene glycol, glycerin or sub-combinations thereof or combinations thereof.

In an example embodiment, flavoring, a flavorant, or a flavor system, is in the pre-aerosol formulation in order to release an aroma and/or flavors during operation, including in some cases, upon heating and/or as an airflow passes through the non-combustible aerosol device 100. In an example embodiment, the flavoring includes volatile tobacco flavor compounds. Flavoring may also include flavors besides tobacco, or in addition to tobacco flavoring. The flavoring may be at least one flavorant that is a natural flavorant or an artificial flavorant. For instance, the at least one flavorant may include tobacco flavor, tobacco extract, menthol, wintergreen, peppermint, herb flavors, fruit flavors, nut flavors, liquor flavors, roasted, minty, savory, cinnamon, clove, and any other desired flavors, and combinations or sub-combinations thereof. In some example embodiments, a pre-aerosol formulation housing 200 that includes a tobacco material is referred to as a tobacco element.

In operation, with the non-combustible aerosol device 100 in an assembled configuration, a negative pressure may be applied on the mouthpiece 125. For example, the negative pressure may be drawn upon the mouthpiece 125. This negative pressure may cause an internal pressure drop inside the non-combustible aerosol device 100 that may cause an inlet air flow to enter the non-combustible aerosol device 100 via the air inlets 120. The internal pressure drop may also cause an internal pressure drop within the heating section 110 as air is drawn through air inlet 120 (via an air flow path traveling through section 110).

The air flow sensor 164 may be exposed to the channel 174. In an example embodiment, the air flow sensor 164 generates an output signal indicative of a magnitude and direction of the airflow 350a through the inner passage 182, where the control circuitry 162 receives the air flow sensor 164 output signal and determine if the following internal conditions exist: (1) a direction of the airflow 350a indicates a draw on the mouthpiece 125 (versus blowing air through the mouthpiece 125), and/or (2) a magnitude of the airflow 350a exceeds a threshold value. In some example embodiments, only one condition may be sufficient to activate the heater 148, while in other examples, two conditions or all conditions may have to be met before activating the heater. If these internal conditions of the non-combustible aerosol device 100 are met, the control circuitry 162 electrically closes the electrical circuit to connect the power supply 152 to the heater 148, thereby activating the heater 148 by sending an electrical current to the heater 148. In an example embodiment, the air flow sensor 164 generates a variable output signal that is in at least partial correlation with a magnitude of the pressure drop sensed by the sensor 106.

The air flow sensor 164 may be a sensor as disclosed in "Electronic Smoke Apparatus," U.S. application Ser. No. 14/793,453, filed on Jul. 7, 2015, or a sensor as disclosed in "Electronic Smoke," U.S. Pat. No. 9,072,321, issued on Jul. 7, 2015, each of which are hereby incorporated by reference in their entirety into this document. Other type of sensors to detect an airflow may be used.

In at least some example embodiments, the non-combustible aerosol device 100 may include a temperature sensor to monitor a temperature of the heater 148 and feedback the sensed temperature to the control circuitry 162. The control circuitry 162 may use the sensed temperature and/or the sensed pressure drop to control the power supplied to the heater 148.

Wires 180a and 180b carry an electrical current to the heater 148 in order to energize the heater 148. The energized heater 148 in turn heats the pre-aerosol formulation housing 200. The first plate 205, the second plate 210, the outer wall 215 and the internal structures 220 conduct the heat from the heater 148 to heat the flavor material within the pre-aerosol formulation housing 200. The pre-aerosol formulation housing 200 conducts the heat from the heater 148 to heat the flavor material to a temperature sufficient to generate an aerosol without combusting the flavor material (e.g., 100 to 300 degrees Celsius).

In another example embodiment, the non-combustible aerosol device 100 may include a push button to operate the non-combustible aerosol device 100 and cause the power supply 152 and the control circuitry 162 to supply power to the heater 148.

The aerosol may elute nicotine and/or tobacco elements into the flow stream. Some thermal reactions may also be present between the aerosol and the tobacco element.

Figure 4:
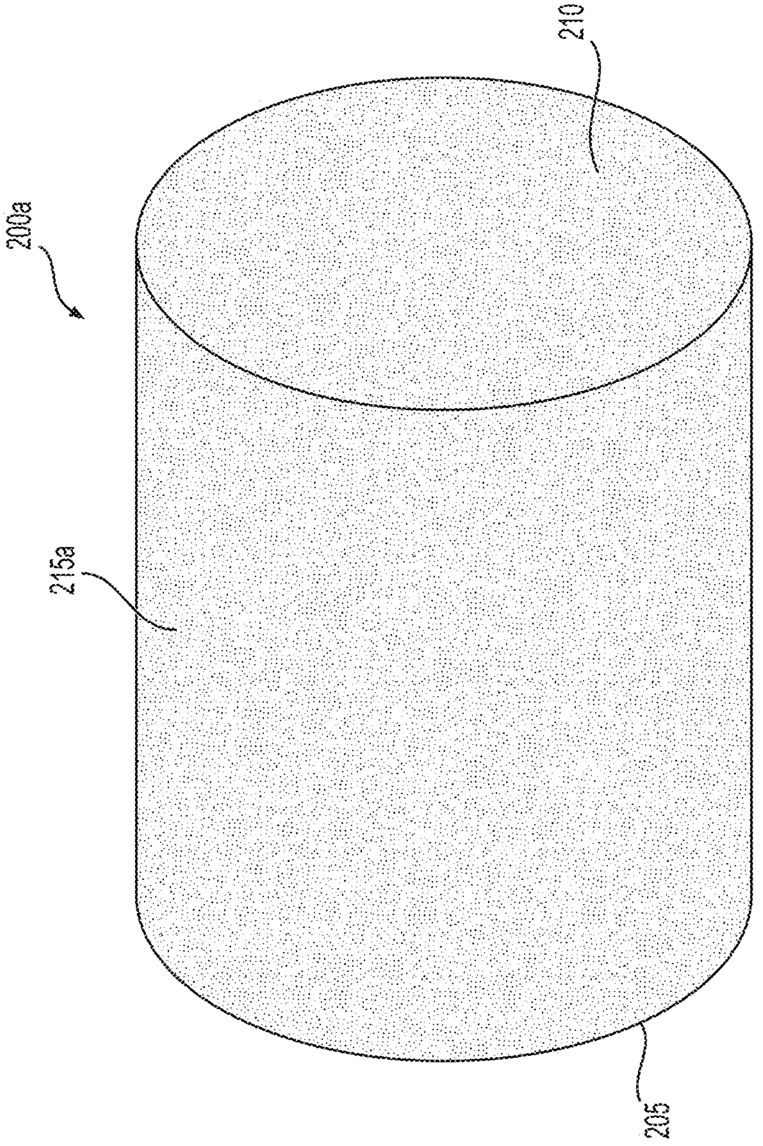
FIG. 4 illustrates a pre-aerosol formulation housing according to some example embodiments.

FIG. 4 illustrates a pre-aerosol formulation housing according to some example embodiments. As shown in FIG. 4, a pre-aerosol formulation housing 200a includes an outer wall 215a that is a solid material.

In example embodiments including the pre-aerosol formulation housing 200a, the non-combustible aerosol device 100 includes a piercing mechanism to pierce at least one of the outer wall 215a, the first plate 205 and the second plate 210 upon the pre-aerosol formulation housing 200a being inserted into the non-combustible aerosol device 100. The piercing generates an outlet for the aerosol that is generated with a flavor material within the pre-aerosol formulation housing 200a when the pre-aerosol formulation housing 200 is heated to an aerosol producing temperature (e.g., 100 to 350 degrees Celsius).

Figure 5:
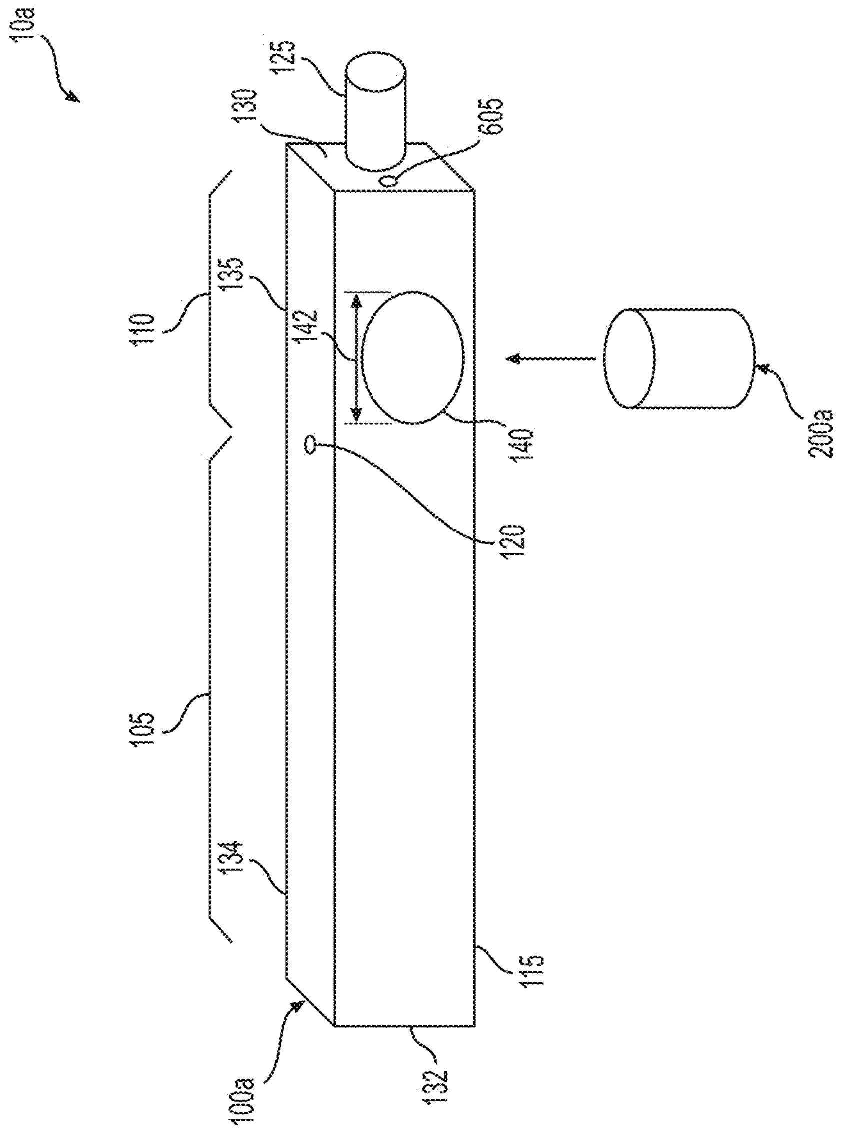
FIG. 5 illustrates a side view of a non-combustible aerosol system using the pre-aerosol formulation housing of FIG. 4 according to some example embodiments.

FIG. 5 illustrates a side view of non-combustible aerosol system using the pre-aerosol formulation housing of FIG. 4 according to some example embodiments.

Figure 6:
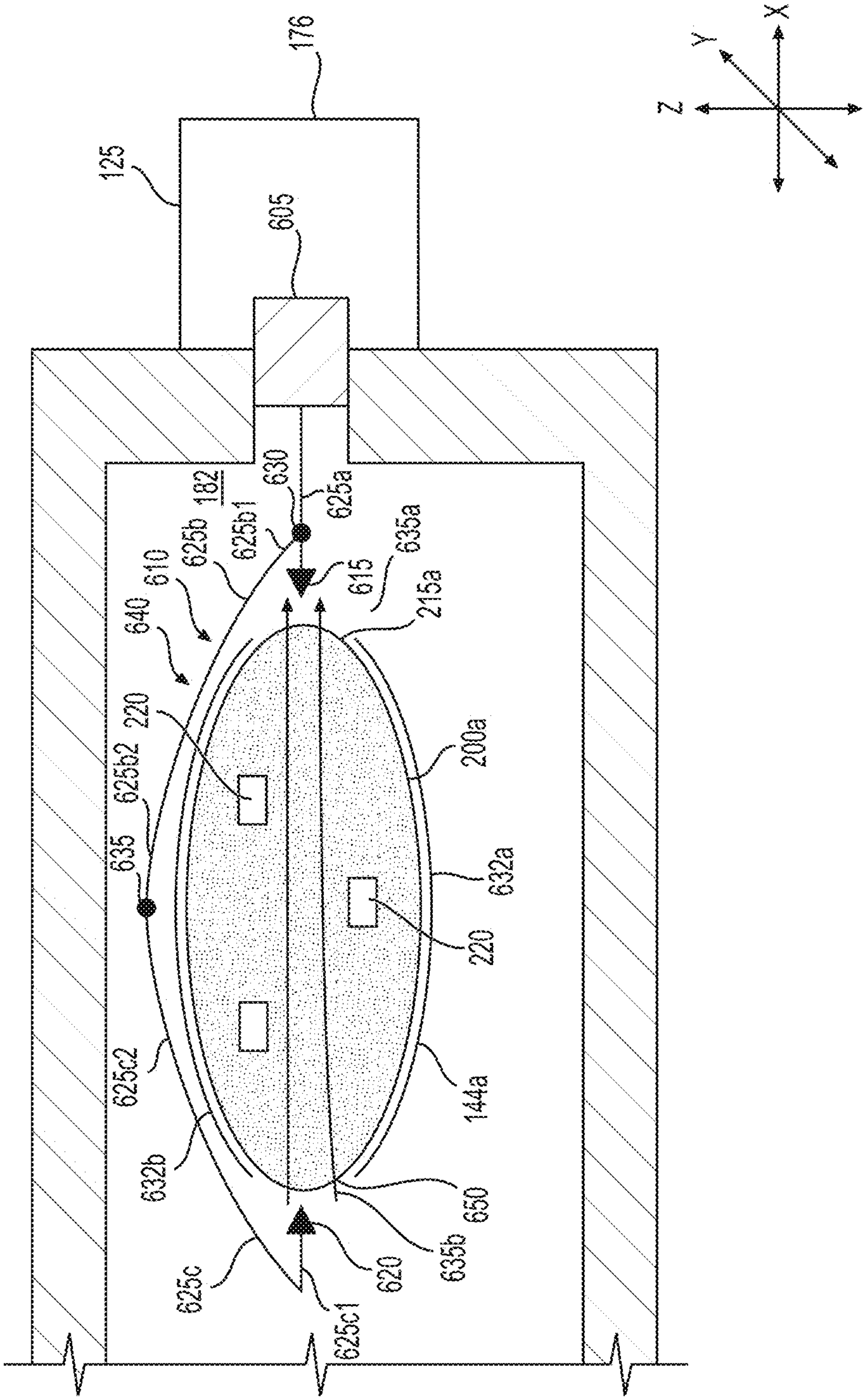
FIG. 6 illustrates a cross-sectional view of the non-combustible aerosol system of FIG. 5.

FIG. 6 illustrates a cross-sectional view of the non-combustible aerosol system of FIG. 5.

A non-combustible aerosol system 10a, shown in FIG. 5, is the same as the non-combustible aerosol system 10 except a non-combustible aerosol device 100a includes a button 605 at the first end 130 to actuate a piercing structure.

As shown in FIG. 6, the button 605 actuates a piercing structure 610 to pierce the pre-aerosol formulation housing 200a. In an example embodiment, the piercing structure 610 includes a first piercing element 615 (e.g., a blade), a second piercing element 620 (e.g., a blade), rods 625a-625c, a first link 630 and a second link 635.

The rod 625a extends in the longitudinal axis of the non-combustible aerosol device 100a and couples the button 605 and the first piercing element 615. The first link 630 couples the rod 625a to a first end 625b1 of the rod 625b. The first link 630 may be a pin that extends through the rod 625a and the rod 625b to permit the rod 625b to rotate along an axis of the first link 630. The axis of the first link 630 about which the rod 625b may rotate may be transverse to the longitudinal axis of the non-combustible aerosol device 100a. In other example embodiments, the first link 630 may maintain the positional relationship between the rod 625a and the rod 625b.

The rod 625b extends over a chamber 144a from the first end 625b1 to a second end 625b2. The chamber 144a may differ from the chamber 144 in that the chamber 144a includes two semicircular sections 632a and 632b. In at least a portion of the chamber 144a along the longitudinal axis of the chamber 144a, the semicircular sections 632a and 632b define openings 635a and 635b between the semicircular sections 632a and 632b.

Similar to the rod 625b, the rod 625c extends over the chamber 144a from a first end 625c1 to a second end 625c2.

The second link 635 couples the second end 625b2 of the rod 625b to the second end 625c2 of the rod 625c. The second link 635 may be a pin (e.g., spring loaded) that allows both the rod 625b to rotate about the second link 635. As shown in the example embodiment of FIG. 6, the second piercing element 620 is integral with the rod 625c. The first end 625c1 is angled toward the pre-aerosol formulation housing 200a such that the second piercing element 620 faces the pre-aerosol formulation housing 200a. However, it should be understood example embodiments are not limited thereto.

When an adult aerosol consumer pushes the button 605 toward the inner passage 182, the force applied by the adult aerosol consumer causes the rod 625a and, more specifically, the first piercing element 615 to travel towards the pre-aerosol formulation housing 200a and pierce the wall 215a of the pre-aerosol formulation housing 200a. The second link 635 permits the rod 625b to rotate in a direction 640. The force applied by the first piercing element 615 onto the pre-aerosol formulation housing 200a causes the pre-aerosol formulation housing 200a to move in a direction the same as the longitudinal axis of the non-combustible aerosol device 100a or a substantially similar direction. The pre-aerosol formulation housing 200a moves to the second piercing element 620, which pierces the pre-aerosol formulation housing 200*a* when the adult aerosol consumer applies the force to the button 605. The piercing by the first piercing element 615 and the second piercing element 620 create an airflow path 650 through the pre-aerosol formulation housing 200*a* to the outlet 176.

While FIG. 6 illustrates a button activated piercing structure, example embodiments are not limited thereto. For example, a piercing structure using a lever and release spring to pierce a pre-aerosol formulation housing may be used.

Figure 7A:
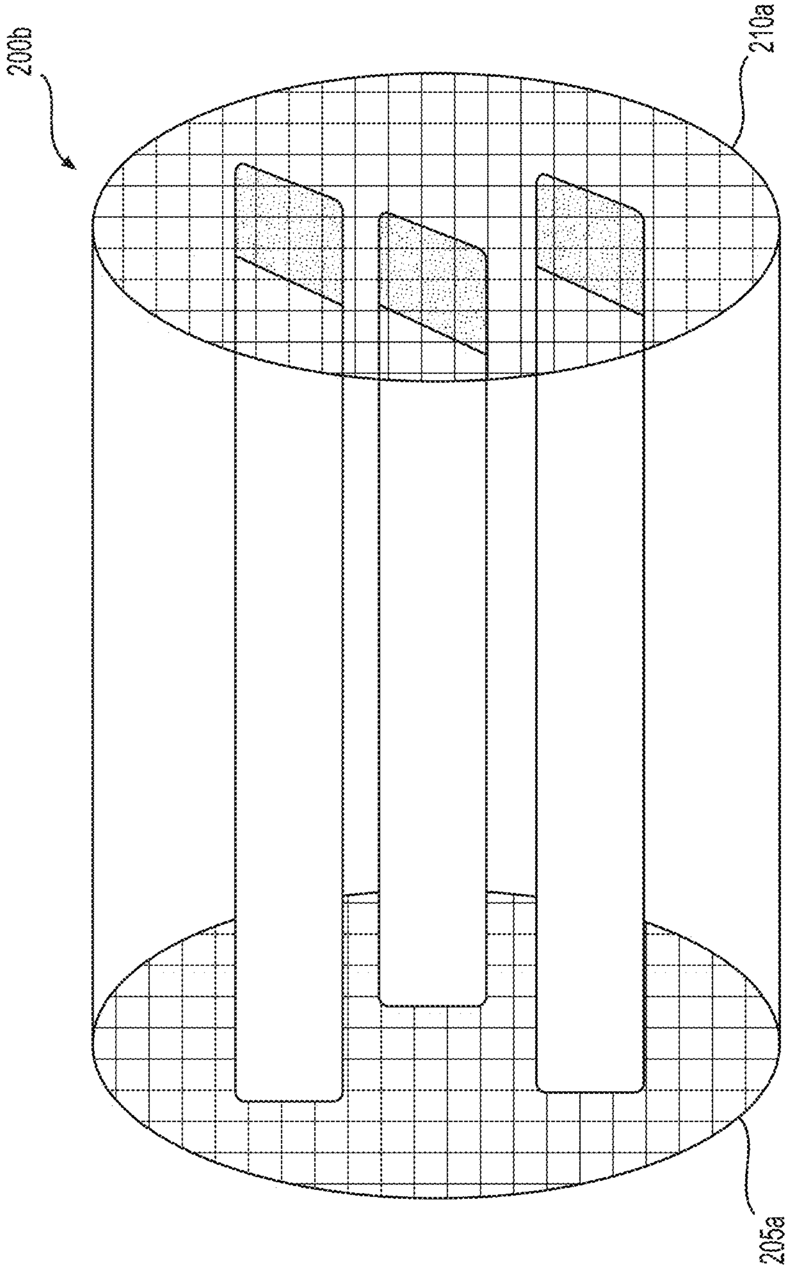
FIGS. 7A-7C illustrate some example embodiments of a pre-aerosol formulation housing.

FIG. 7A illustrates an example embodiment of a pre-aerosol formulation housing. As shown in FIG. 7A, a pre-aerosol formulation housing 200*b* is the same as the pre-aerosol formulation housing 200 except plates 205*a* and 210 are a mesh instead of solid. The mesh may be a screen-type of material made of pure metals, metal-alloy, or polymer. The hole size may range from 0.001 to 0.1 inch. In FIG. 7A, the wall 215 is omitted for clarity.

Figure 7B:
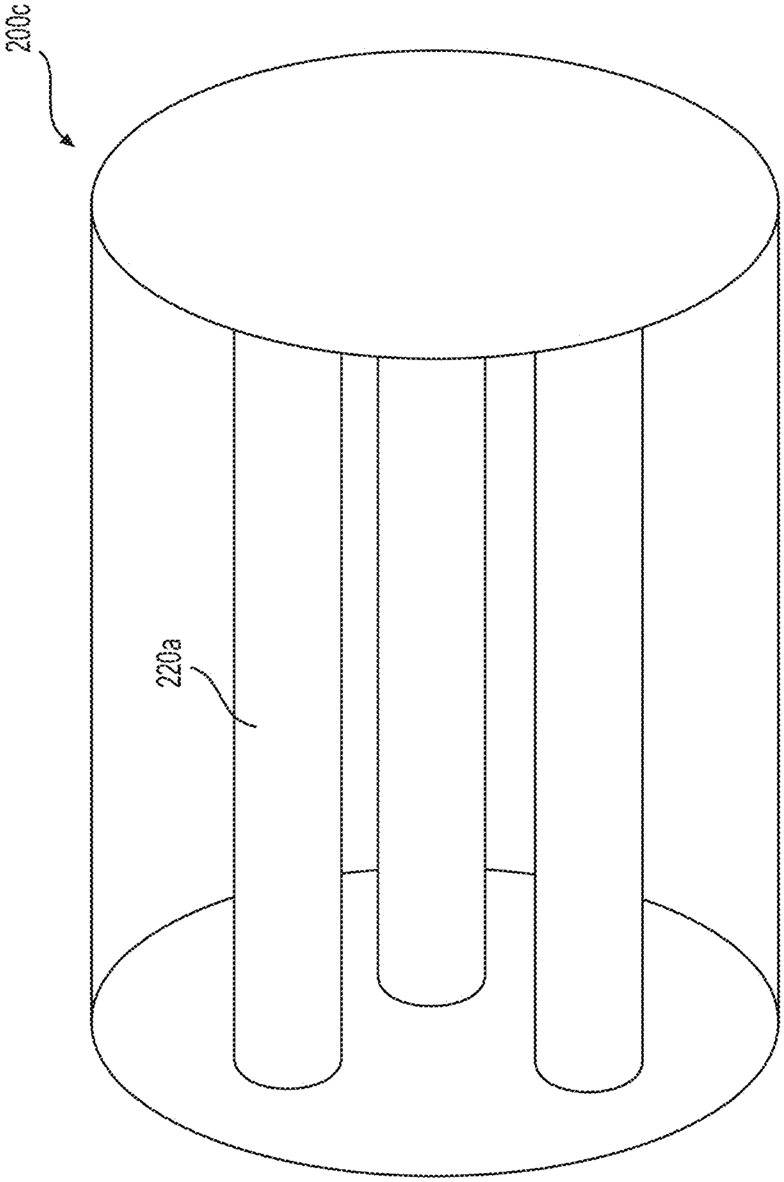

FIG. 7B illustrates an example embodiment of a pre-aerosol formulation housing. As shown in FIG. 7B, a pre-aerosol formulation housing 200*c* is the same as the pre-aerosol formulation housing 200 except the internal structures 220*a* have a circular cross-section instead of a square cross-section. The wall 215 is omitted for clarity.

Figure 7C:
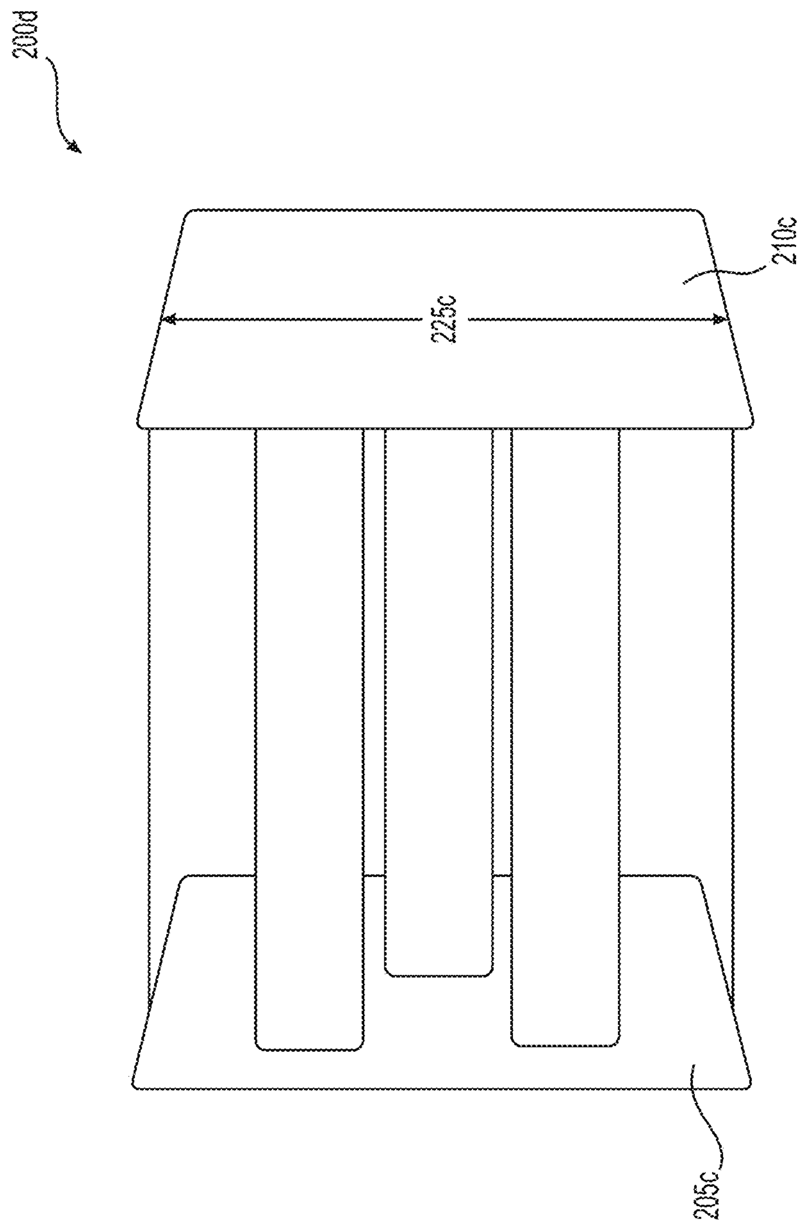

FIG. 7C illustrates an example embodiment of a pre-aerosol formulation housing. As shown in FIG. 7C, a pre-aerosol formulation housing 200*d* is the same as the pre-aerosol formulation housing 200 except plates 205*a* and 210 are square instead of circular. The wall 215 is omitted for clarity. The wall 215 extends around each of the four edges of each plate 205*c* and 210*c*. A height 225*c* of the plates 205*c* and 210*c* may be between 1-20 millimeters.

Figure 8:
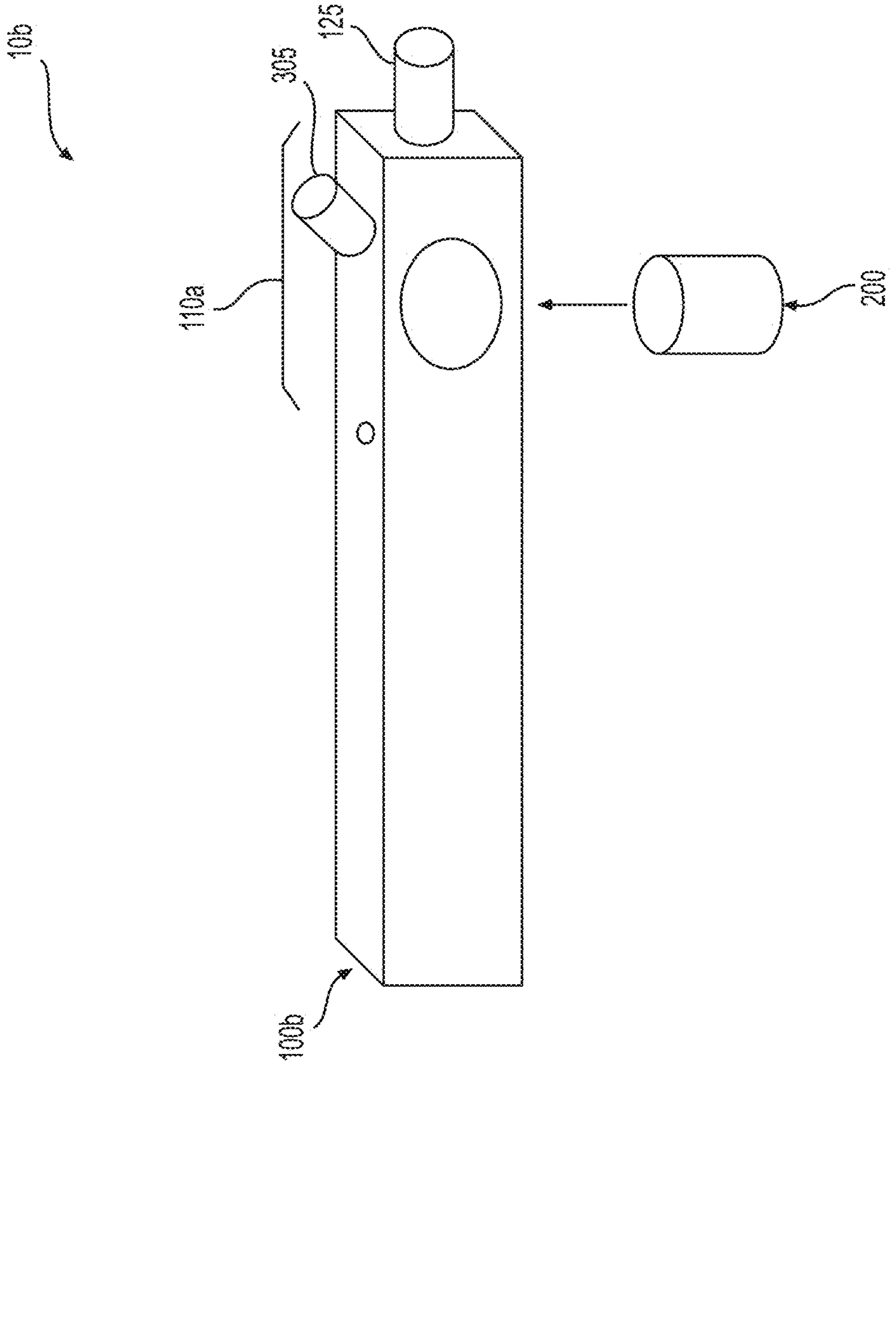
FIG. 8 is a side view of non-combustible aerosol system according to some example embodiments.
Figure 9:
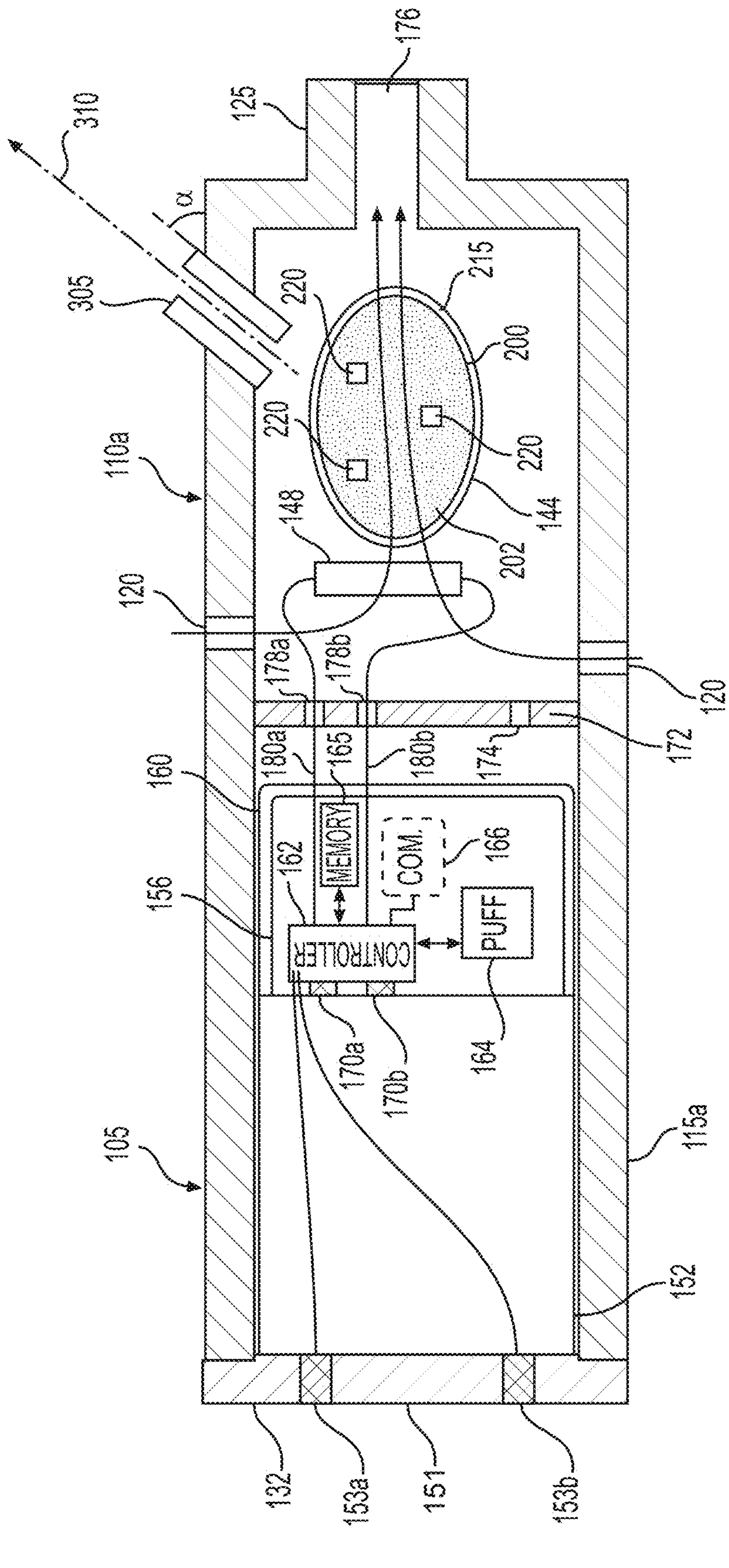
FIG. 9 illustrates a cross-sectional view of the non-combustible aerosol device of FIG. 8.

FIG. 8 is a side view of non-combustible aerosol system according to at least another example embodiment. FIG. 9 illustrates a cross-sectional view of the non-combustible aerosol device of FIG. 8.

A non-combustible aerosol system 10*b*, shown in FIG. 8, is the same as the non-combustible aerosol system 10 except a heating section 110*a* of a non-combustible aerosol device 100*b* includes an olfactory port 305.

As shown in FIG. 9, the olfactory port 305 is located over the chamber 144 and the pre-aerosol formulation housing 200 (when the pre-aerosol formulation housing 200 is inserted into the chamber 144). The olfactory port 305 extends at an angle α from the heating section 110. The angle α may be greater than zero degrees and less than or equal to 90 degrees such that the adult aerosol consumer can smell the aerosol produced by the non-combustible aerosol device 100*b*. The olfactory port 305 allows a portion of the air exposed to the flavorant in the pre-aerosol formulation housing 200 to flow out of the olfactory port 305 as indicated by airflow 310.

In an example embodiment, the olfactory port 305 is integral with a housing 115*a* and made of the same material as the housing 115*a*.

In an example embodiment, the olfactory port 305 is a one way valve as to not affect the RTD. Moreover, the olfactory port 305 may be opened and closed as desired by the adult consumer. For example, a user interface such as a needle valve or slide could be attached to the housing 115*a* to enable control of the olfactory port 305 by the adult consumer.

Figure 10:
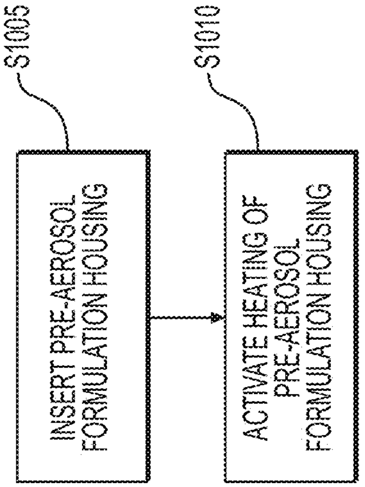
FIG. 10 illustrates a method of operating a non-combustible aerosol system according to some example embodiments.

FIG. 10 illustrates a method of operating a non-combustible aerosol system according to at least one example embodiment. The non-combustible aerosol system may a system encompassed described in any of FIGS. 1-9.

At S1005, an adult aerosol consumer inserts a per-aerosol formulation housing into a non-combustible aerosol device. The pre-aerosol formulation housing defines an internal volume for containing a pre-aerosol formulation and includes a plurality of internal structures extending from a first end of the housing to a second end of the housing. The plurality of internal structures extend through the internal volume and are configured to heat the pre-aerosol formulation to generate an aerosol by conducting the heat supplied by a heater to the internal volume. For example, the adult aerosol consumer may insert the pre-aerosol formulation housing 200 into the non-combustible aerosol device 100.

At S1010, the adult aerosol consumer activates the non-combustible aerosol device by applying a negative pressure at a mouthpiece. The negative pressure causes a sensor to send to control circuitry a signal representing the pressure in the non-combustible aerosol device. Based on the signal, the control circuitry activates the heater. The pre-aerosol formulation housing may conduct the heat generated by the heater to the pre-aerosol formulation to an extent that the flavoring, nicotine and/or ingredients in the pre-aerosol formulation is at least partially extracted (e.g., aerosolized) to create a downstream aerosol that is extracted from the pre-aerosol formulation.

Example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

We claim:

1. A cartridge for a non-combustible aerosol system, comprising:
- a cartridge housing defining an opening to a chamber in at least one side of the cartridge housing;
- a heater configured to supply heat to the chamber in the cartridge housing, the heater extending transversely across an inner passage of the cartridge housing; and
- a pre-aerosol formulation housing configured to be inserted into the chamber, the pre-aerosol formulation housing including,
  - a first plate,
  - a second plate opposite the first plate,
  - an outer wall extending between the first plate and the second plate, and
  - a plurality of internal structures extending from the first plate to the second plate, the plurality of internal structures configured to conduct heat supplied by the heater and heat a solid substrate within the pre-aerosol formulation housing.

2. The cartridge of claim 1, wherein the first plate and the second plate are a first material and the plurality of internal structures are a second material, the first material and the second material are different.

3. The cartridge of claim 1, wherein the first plate, the second plate and the plurality of internal structures are a same material.

4. The cartridge of claim 1, wherein the outer wall includes one of a solid and a mesh.

5. The cartridge of claim 4, wherein the outer wall is solid and the cartridge housing includes,
- a piercing element configured to pierce the pre-aerosol formulation housing and generate an outlet for an aerosol.

6. The cartridge of claim 4, wherein the outer wall is a mesh and provides an outlet for an aerosol.

7. The cartridge of claim 1, wherein the pre-aerosol formulation housing is cylindrical.

8. The cartridge of claim 1, wherein the first plate and the second plate include of a square or rectangular shape.

9. The cartridge of claim 1, wherein the non-combustible aerosol system is not configured to supply an electrical current to the pre-aerosol formulation housing.

10. The cartridge of claim 1, wherein the solid substrate includes at least one of tobacco leaf, reconstituted tobacco, compressed tobacco rod, powdered tobacco, a sub-combination thereof or a combination thereof.

11. The cartridge of claim 1, wherein the plurality of internal structures are different materials.

12. The cartridge of claim 1, wherein the plurality of internal structures extend in a direction that traverses a longitudinal axis of the cartridge housing.

13. The cartridge of claim 1, wherein the plurality of internal structures includes a circular cross section.

14. The cartridge of claim 1, wherein the plurality of internal structures includes a square cross section.

15. The cartridge of claim 1, wherein the cartridge housing is configured to be removably coupled to a power section housing.

16. The cartridge of claim 15, wherein the power section housing includes:

a sensor configured to detect air flow in the chamber; and a controller configured to supply power to the heater based on the detected air flow.

17. The cartridge of claim 1, further comprising:

a first piercing element configured to pierce a first end of the pre-aerosol formulation housing; and a second piercing element opposite the first piercing element configured to pierce a second end of the pre-aerosol formulation housing.

18. The cartridge of claim 17, wherein the first piercing element and the second piercing element are configured to generate an air flow path through the pre-aerosol formulation housing to an outlet in the cartridge housing.

19. The cartridge of claim 17, wherein a first end of the cartridge housing includes a button configured to move the first piercing element into the first end of the pre-aerosol formulation housing and to move the pre-aerosol formulation housing toward the second piercing element in response to a force applied to the button.

20. The cartridge of claim 1, further comprising an outlet on a side of the cartridge housing.

21. The cartridge of claim 20, wherein the outlet is a one-way valve.

22. The cartridge of claim 20, wherein the outlet is an olfactory port adjacent the chamber and air exposed to a flavorant in the pre-aerosol formulation housing is configured to flow out of the olfactory port.

23. The cartridge of claim 20, wherein the outlet extends at an angle from the cartridge housing.

* * * * *